United States Patent [19]

De Steur et al.

[11] 4,068,677
[45] Jan. 17, 1978

[54] PROCESS CONTROL CIRCUIT FOR METAL-DEPOSITING BATHS

[75] Inventors: Hubert De Steur, Drongen, Belgium; Wolfgang Pernegger, Erlangen; Egon Bussmann, Munich, both of Germany

[73] Assignee: Siemens Aktiengesellschaft, Berlin & Munich, Germany

[21] Appl. No.: 688,784

[22] Filed: May 21, 1976

[30] Foreign Application Priority Data

June 3, 1975    Germany .............................. 2524589

[51] Int. Cl.² ..................... G05D 11/13; C25B 15/02; C25D 21/14
[52] U.S. Cl. ...,................................. 137/93; 204/228
[58] Field of Search ................. 137/88, 93; 204/46 G, 204/195 F, 228, 229

[56] References Cited

U.S. PATENT DOCUMENTS

| 3,361,150 | 1/1968 | Horner .................................. 137/93 |
| 3,532,102 | 10/1970 | Glassey .............................. 137/93 X |
| 3,607,549 | 9/1971 | Bielefeld, Jr. ...................... 137/93 X |
| 3,650,196 | 3/1972 | Hosoe et al. ........................... 137/93 |
| 3,674,672 | 7/1972 | Whitesell ........................... 137/93 X |

*Primary Examiner*—William R. Cline
*Attorney, Agent, or Firm*—Hill, Gross, Simpson, Van Santen, Chiara & Simpson

[57] ABSTRACT

A process control circuit which is adapted for the control and monitoring of a plurality of parameters in one or more metal-depositing baths, has parameter control circuit blocks for each of the parameters to be measured. Each of the parameter control circuit blocks has a measuring stage for producing a measured value corresponding to one of the parameters, a calibration stage for calibrating the measuring stage, a comparison stage for comparing the measured value to a stored nominal value, and a dosing circuit which is connected to the comparator and which doses the metal-depositing bath in response to a comparison signal from the comparator.

11 Claims, 5 Drawing Figures

PROCESS CONTROL CIRCUIT FOR METAL-DEPOSITING BATHS

BACKGROUND OF THE INVENTION

1. Field of the Invention:

The invention concerns a process control circuit for the control and monitoring of at least one metal-depositing bath, particularly, a gold bath.

2. Description of the Prior Art:

For the purpose of automatic analyses of liquid substances, it is obvious to use a program-controlled automatic analysis machine (German Offenlegungsschrift Nos. 2 341 149 or 2 113 854), consisting of a control device, a measuring stage and a regulating stage, as well as a dosing device. In the case of an analysis device for metal-depositing baths, it is necessary that the analysis of several parameters and/or components in a bath be carried out as rapidly as possible and, particularly, in the case of gold baths, with a high degree of precision. Thus, for example, in the case of a gold bath, the gold concentration level must be kept within a narrow range of a predetermined nominal value. The smaller this range, the more uniform the deposited layer becomes such that the consumption of the precious metal is optimally minimized. It is necessary to detect as measured quantities all the parameters which effect the function of the bath or baths. Parameters of this type are the pH-value, the concentration of the metal components in the bath fluids, as well as the temperature at the time of analysis. Also, the measuring electrode of a pH-value regulator degenerates in the course of time; i.e., it demonstrates a divergence vis-a-vis a calibration-buffer solution. In addition, in the case of a gold bath-analysis device with a colorimeter stage, it was determined that the windows of the colorimeter vessel become turbid as a result of condensation formation. Such turbidity leads to an erroneous result in a subsequent measurement. The pH-value regulator as well as the analyzer-section which determines the metal concentration, such as the gold bath analysis device, indirectly controls the influx of correction fluid to the bath. It is therefore important that the measured values be permitted to exhibit only a small deviation of ± 1%, at the most, from the actual values. The individual analyses must be capable of being carried out at as high a speed as possible, since only a repeated analysis of each of the baths makes it possible to maintain narrow ranges of individual bath temperatures to be measured and regulated.

SUMMARY OF THE INVENTION

An object of the invention is therefore to produce a process control circuit for the monitoring as well as the control of one or more metal-depositing baths, particularly for one or more gold baths, whereby the circuit analyses for the individual parameters of the bath fluid which are to be carried out take place simultaneously. Furthermore, prior to each analysis to be carried out, there should be an automatic adjustment or calibration of the circuit. Also, it is an object of the circuit to provide an interrogation of several baths regarding their respective temperatures, the pH-values, and the concentration of the metal or metals at any time and selectively. If any measuring value exceeds a predetermined boundary value, a warning should take place and the dosage to the respective bath should be blocked.

According to the invention, the objects are achieved by providing a process control circuit which has a plurality of parameter control circuit blocks, each circuit block comprising a measuring stage, a calibration adjustment or balancing device, a nominal value generator or comparator, and a doser circuit. The circuit blocks are capable of being switched and actuated by a program generator such that they operate simultaneously and independently of one another.

The process control circuit of this invention permits analyses with high precision and relative rapidity and maintains the baths within a permitted range around the nominal values of the individual parameters of the bath fluids. Prior or subsequent to several analyses of a bath fluid, whether it be regarding the pH-value or the metal content, there is an automatic adjustment or balance of the respective measuring stage. Adjusting devices serve this purpose. A nominal value generator or comparator is connected to the measuring stage and the difference between the measured value and the nominal value is determined in a difference circuit inserted after the nominal value generator. If there is a divergence between the actual and nominal values, a signal is presented to the dosing device which indirectly controls the dosage valve assigned to it. The dosing device serves the purpose of supplying the specific correction fluid to the bath being subjected to analysis. As is known, a temperature compensator is assigned to the respective measuring stage circuit. This compensator corrects the measured value if it deviates from a predetermined standard temperature since the pH value measurement and the measurement for determining the gold content are very temperature dependent. Only this corrected measurement value reaches the measuring value calibrator device. Thus, the adjustment by the calibrator device takes place for a measuring value which has already been corrected with regard to temperature.

The process control circuit comprises at least one parameter control circuit block for monitoring and regulating the metal concentration, and at least one additional parameter control circuit block for monitoring and regulating the pH value of the bath fluid to be monitored. The circuit block for monitoring the metal concentration of the bath fluid has in its measuring stage two photoconductive resistors which are connected to a colorimeter, an amplifier, and an automatically operated potentiometer, the center tap of which is situated at the input of the amplifier. One of the photoconductive resistances is arranged in a feedback line of the amplifier and is connected to the potentiometer. The other end of the potentiometer is connected to the other photoconductive resistor. During one operating condition, which may be activated by means of a program switch, the measured value output from the amplifier indirectly drives a servomotor operating the potentiometer. Depending upon the polarity of the voltage amplitude, the servomotor drives the potentiometer towards an ideal position so that an ideal voltage is connected to the output of the amplifier. In this condition, the aforementioned switch opens. The measuring stage has now been calibrated and is ready for operation.

Each parameter control circuit block is provided only once in the process control circuit, whereas the number of measured value storage units and boundary value monitors provided in the process control circuit are proportionate to the number of baths which are to be monitored with the process control circuit multiplied by the number of parameters to be measured in the individual baths being monitored. The measured value storage units as well as the boundary value monitors for the individual bath parameters of the various baths are of uniform construction so that they are capable of being inserted in the process control circuit as similar printed circuit boards.

According to a prescribed program, the bath to be analyzed is selected from a plurality of baths. The bath fluid is supplied to an analyzer comprising a plurality of analysis sections. The individual analysis section construction depends upon the type of chemical composition of the bath which is to be monitored. If a gold bath is to be monitored and controlled, the analyzer has an analysis section for determining the gold concentration consisting, among other things, of a colorimeter and an additional analysis section with a pH-value regulator, as well as an analysis section for determining the cobalt concentration of the bath fluid. A parameter control circuit block is assigned to each analysis section of the analyzer. The measured values output by the circuit blocks are connected to the measured value storage units assigned to the bath which is to be analyzed and to which the boundary value monitors are also assigned.

DESCRIPTION OF THE PREFERRED EMBODIMENTS

Figure 1:
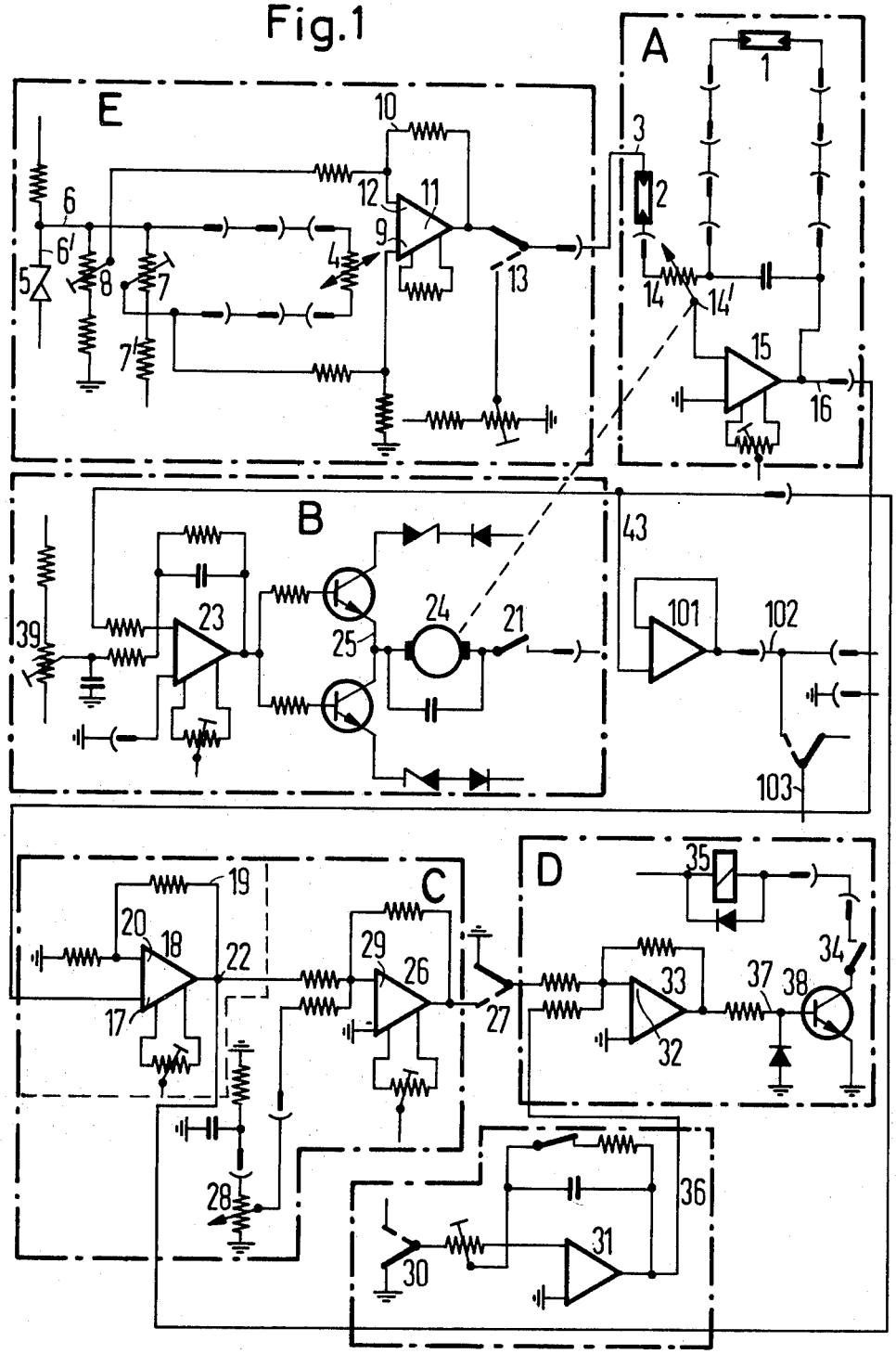
FIG. 1 illustrates the parameter control circuit block for determining the gold concentration for a gold-depositing bath.

FIG. 1 illustrates a component or parameter control circuit block for determining a metal concentration such as gold in a gold-depositing bath. The component or parameter circuit block comprises a measuring stage A, an adjustment or calibrating device B, a nominal value generator C, and a dosing device D. In addition, the circuit block has a temperature-compensated voltage source E. In the present example, determination of the metal concentration of the bath fluid takes place colorimetrically, namely, by means of a two-beam colorimeter, which exhibits a photoelectric cell 1 for the measuring beam, and a photoelectric cell 2 for the reference beam. In the measuring stage, photoelectric cells are constructed as photoconductive resistors.

A temperature compensation stage E is connected to the measuring stage A. This stage has a thermistor 4 which is connected to an extraction receptacle of the gold bath analyzer. This thermistor 4 is connected to a voltage path 6' which is stabilized by a zener diode 5 at a voltage divider-tap 6. The sensitivity of the thermistor is adjustable on a trimmer potentiometer 7. In addition, the measuring voltage is adjustable to +0.2V by an additional trimmer potentiometer 8. If there is a temperature change in thermistor 4, the measuring voltage fluctuates for example, around +0.2V (10 mV/° C), in proportion to the temperature change. Potentiometer 7, thermistor 4, and resistance 7' form a voltage divider. The measuring voltage tapped from the divider is connected to the input 9 of an amplifier 11 having a feedback loop 10 connected at the other input 12 which is also connected to the voltage tapped from potentiometer 8.

When switch 13 is activated by a program generator and rests in the illustrated position, a voltage which has been corrected with regard to the temperature of the bath under measurement is connected to 3 at reference photoconductive resistor 2. For example, if the temperature of the fluid subjected to a colorimeter examination differs by 2° C from the standard temperature (20° C) a voltage difference deviating from +0.2V (at 20° C) results at inputs 9 and 12 of amplifier 11 such that a proportional voltage change occurs at photoconductive resistor 2.

As is apparent, a measuring beam photoresistor 1 is located within measuring stage A in the feedback loop of measured value amplifier 15 whereby the photoconductive resistors 1 and 2 respectively form the feedback resistance and the input resistance. If the exposure at photoconductive resistor 1 differs as compared with the exposure at photoconductive resistor 2, the amplification factor of amplifier 15 is thereby changed. The circuit is designed such that, given equal exposure intensity on both photoconductive resistors 1 and 2, the amplification is equal to 1, and the output voltage on line 16 becomes +0.2V (at 20° C); in the case of a divergence of the resistance values, the amplification factor is changed; the output voltage differs from +0.2V (at 20° C) and the signal connects via line 16 to an amplifier 18, at the output 22 of which provides the measured value. This measured value output at 22 is also connected to the adjustment device B which has an input amplifier 23. A potentiometer 39 serves to reset the device B for ideal operational voltage during calibration.

In the following, the calibrating or adjustment circuit B shall be more closely described with regard to its construction and function. As already stated, the colorimeter measuring vessel or its windows become covered with vapors or condensation caused by the fluid line which is connected to the vessel. As a result, the absorption of the light, as limited by the measuring fluid, undergoes an additional attenuation due to the coating on the vessel windows. To avoid an error in measurement caused thereby, an ideal voltage adjustment of the colorimeter takes place prior to each measurement. In order to effect the ideal voltage adjustment, the temperature compensator E is first separated from measuring stage A; this takes place through the program control device, not illustrated here, by way of switching program switch 13 to the position illustrated with broken lines. Now, a defined measuring voltage of +0.2V is connected to photoconductive resistor 2. Program switch 21 is likewise closed by means of the program control device in the ideal voltage adjustment circuit B. If, in this switched condition, a voltage is connected to amplifier 15 which deviates from 0.2V, a signal will be connected to the output or junction 22 of amplifier 18 and also at the input of ideal voltage adjustment or calibrating device B. A servomotor 24, connected to potentiometer 14, is operated by a transistor switch 25 which obtains drive voltage via feedback input amplifier 23. When the switch 21 is closed, the motor starts in right or left operation, depending upon the connection potential; it sets the potentiometer 14 until the absolute value of the voltage at junction 22 is equal to the ideal adjustment voltage, at which point it automatically shuts off. Switch 13 is re-set and switch 21 is opened by the program generator; motor 24 has no current drive, and the circuit is now ready for measurement.

Now follows the filling of the measuring vessel (not shown) of the colorimeter stage with the fluid to be analyzed. The voltage on the terminals of the measuring beam photoconductive resistor 1 changes. As a result, a measuring signal is connected at 22, and therefore also to the dosing device D. The dosing device is operated by an amplifier 26 after which a switch 27, controlled by the program generator, is inserted. During the dosing operation the switch is in the position illustrated by broken lines. A nominal value generator, consisting of a voltage divider 28 constructed as a manually operated potentiometer adjusts the desired nominal value (grams of gold per liter of bath fluid), and thus provides the nominal value adjustment at measuring input 29 of master amplifier 26. Simultaneously with the closing of program switch 27, a switch 30 of an integrator 31 also closes. The signal voltage emitted from amplifier 26 is connected to input 32 of a dosing amplifier 33. As a result, a safety switch 34 is closed and the dosing relay 35 is actuated when the output voltage on master amplifier 26 is positive. Correction fluid now flows to the bath. During this time, there is a positive increase in voltage at the output 31 of the integrator or timer such that at a given time the voltage on input 32 of amplifier 33 becomes zero and current passage to switching transistor 38 is thus interrupted to de-energize relay 35. Thus, the dosing operation terminates.

Figure 2:
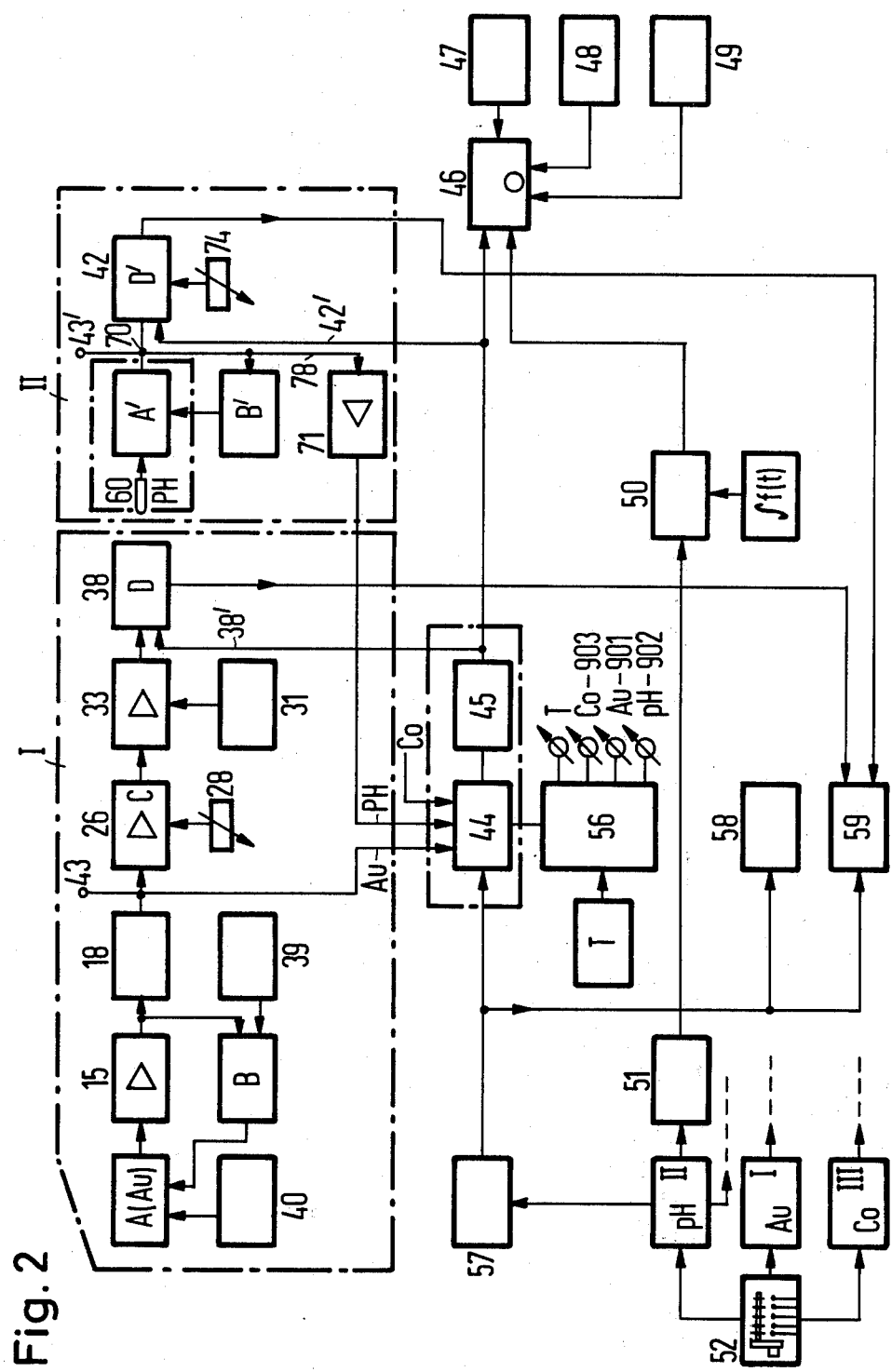
FIG. 2 illustrates a block circuit diagram of the process control circuit with two parameter control circuit blocks, one for determining the gold concentration and an additional circuit block for determining the pH-value; also shown is the assignment of the measured value storage units and boundary value monitors to the circuit blocks.

FIG. 2 illustrates a block circuit diagram of the process control circuit, whereby the component circuit block for monitoring and regulating the metal concentration is illustrated in block I defined by broken lines. This block has been described above and illustrated in FIG. 1, as well as the component circuit block for monitoring and regulating the pH-value, which is illustrated in block II. Component circuit block I consists of measuring stage A, comprising photoconductive resistors 1 and 2, adjustment device B, which operates only during the adjustment or calibration of the colorimeter (here generally designated by 40) nominal value generator C with the adjustment potentiometer 28, amplifier stage 33 with the connected integrator or timer 31 as well as dosing device 38. As shown in FIG. 2, the parameter control circuit block for monitoring and regulating the pH-value of the bath fluid to be monitored likewise has a measuring stage A', a calibrating or adjustment device B', a nominal value generator 74, and a dosing device 42. As is apparent, each circuit block has a measuring output 43, or 43'. Graphic recorders (not illustrated here) and analog storage units 44 are connected to the measuring outputs. A boundary value monitor 45 is connected to the analog storage units respectively and which, when the respective allowable boundary value is exceeded, actuates an alarm system 46 and blocks the respective dosing devices, for example, 38 or 42, via line branches 38' and 42'.

As shown in FIG. 1, blocking of the dosing operation takes place by means of opening relay switch 34. The warning or alarm system 46 also serves the purpose of monitoring the supply of correction fluids, flushing fluids, buffer solutions, and the like, which are necessary for the operation of the process control system. The supply control device is generally designated by 47. In addition, the alarm system is activated if a signal is triggered either from the monitoring circuit 48 of one or more bath circulatory systems or from a signal triggered by drop indicator 49 during the filling of the waste container.

Each analysis section assigned to the measuring stage is flushed with distilled water after a predetermined number of analyses. A preselection counter 51 serves this purpose. During the flushing operation, a flushing indicator 50 delivers a signal to the warning system 46, which indicates the flushing process. The gold bath analyzer is equipped in such a manner that, after each analysis, a rinsing operation of the colorimeter with acetone automatically takes place.

The process control circuit has a program control mechanism 52, which is constructed according to known methods as a camshaft gear, but which may also be constructed as a magnetic band with a decoding device inserted thereafter, such as a process control logic. The program control mechanism activates the analysis section for determining the values of the bath parameters. In the case of a process control circuit for monitoring and regulating a gold bath, the analysis sections are activated for measurement of the gold concentration, cobalt concentration, and the pH-value. In addition, the program control mechanism directly or indirectly activates the program circuit contacts illustrated in the corresponding component-circuit blocks I, II, etc.

A measured value interrogation device 56 (shown in FIG. 2 as a block and in FIGS. 4 and 5 as switch 88) is connected to an analog storage unit 44. The device 56 interrogates by switching at any time the values of the bath fluid parameters, such as the metal concentration, the pH value, the temperature, and the like, by means of activating a selector switch which is assigned to a specific bath. If several baths are monitored and regulated by means of the process control circuit, the illustrated and described circuit may be switched over from one bath to another bath by means of a multi-bath changeover switch 57. The pumps for maintaining the respective bath circulatory systems of the individual baths, including the respective dosing devices 58 and 59, are also operated by control 57.

Figure 3:
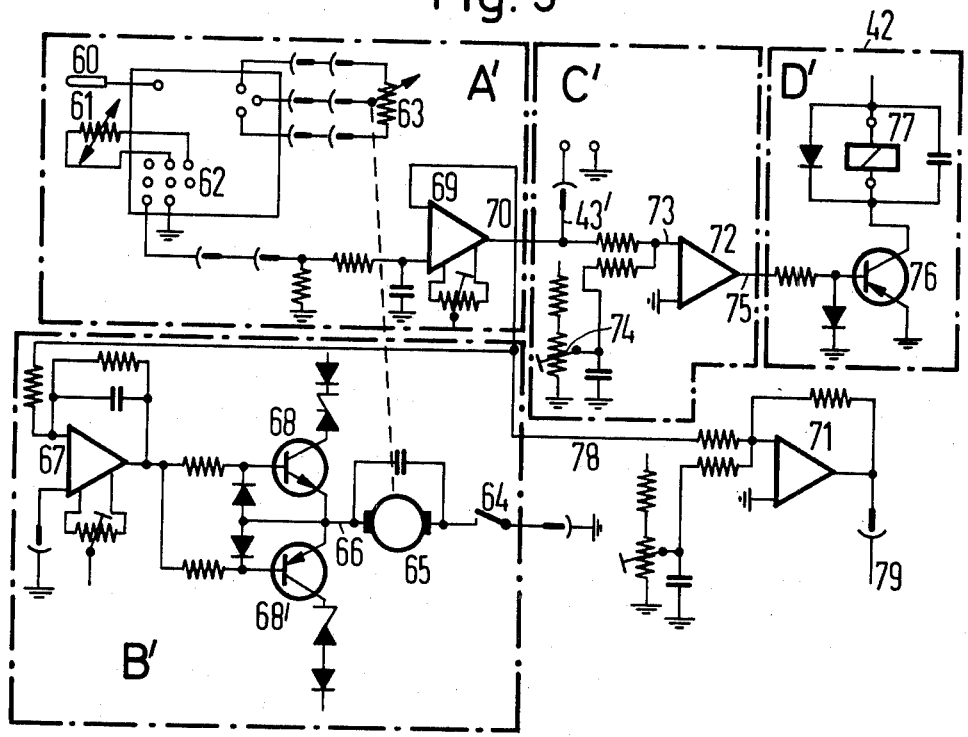
FIG. 3 illustrates the parameter control circuit block for determining the pH-value.

FIG. 3 explicitly illustrates the parameter control circuit block II for monitoring and controlling the pH value for the bath fluid of one of the baths. The circuit blocks I, II, etc. are provided only once in the analyzer portion of the process control circuit, whereas the number of measured value storage units and boundary value monitors corresponds to the number of parameters in the bath fluids of the individual baths to be monitored.

The conventional measuring stage A' (FIG. 3) consists of a pH-measuring electrode 60, a temperature compensator 61, and a measured value compensation device 62. An automatically operating regulating potentiometer 63 is in contact with the measured value compensation device and functions as a calibration or adjustment device. A calibration adjustment takes place after a specific number of measurements of the pH value by means of a calibrated buffer solution supplied to the measuring vessel which is not illustrated here, and which contains the pH-measuring electrodes and the temperature compensator 61. As has already been described regarding the parameter control circuit block 1, a calibration adjustment can take place only if switch 64 of current circuit 66, which contains the potentiometer-servomotor 65, is closed. If switch 64 is open, the entire circuit containing a feedback amplifier 67 and control transistors 68 and 68' (for the right and left operation of servomotor 65) is shut off.

The measured value determined by measured value derivation device 62 is connected to impedance transformer 69, the output of which is connected to a graphic recorder (not shown) via a measured value line 43'. In addition, a branch 78 is connected to an adding device 71, which is connected to the measured value storage unit or units 44 (FIGS. 2, 4 and 5) via a line 79. A third branch of measurement output 70 is connected to dosing amplifier 72 at the input 73, to which an adjustment potentiometer 74 is also connected for the purpose of adjusting the nominal value. This circuit ensures that only when a voltage amplitude analogous to the measured value is exceeded (which corresponds to the nominal value) will a voltage be provided to open switching transistor 76 connected to output 75 of the amplifier 72. In such a case, dosing relay 77 is actuated for the purpose of supplying correction fluid to the bath.

Figure 4:
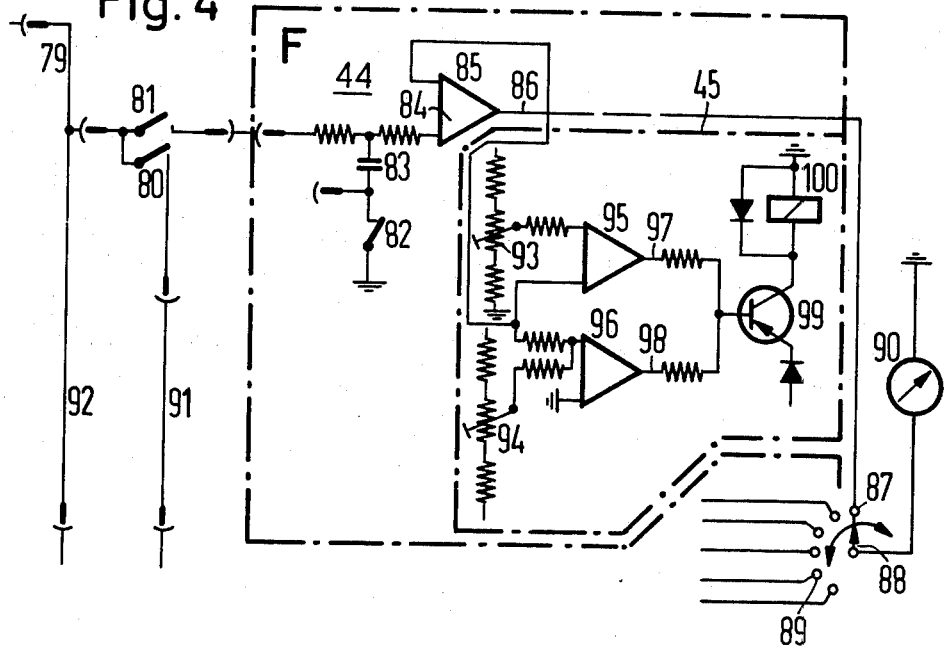
FIG. 4 illustrates a measured value storage unit with a boundary value monitor.
Figure 5:
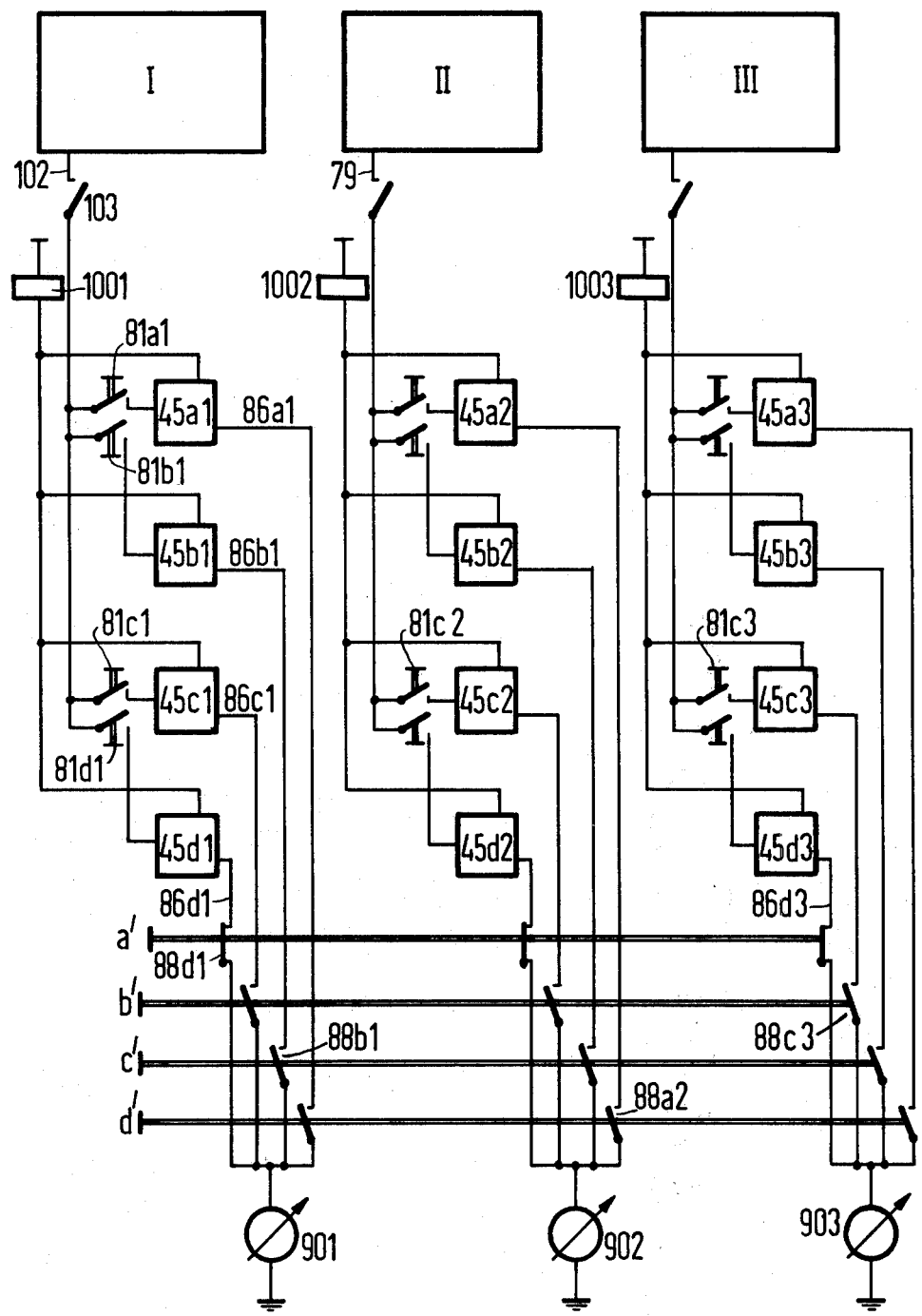
FIG. 5 illustrates the assignment of the measured value storage units and boundary value monitors to the parameter control circuit blocks.

FIG. 5 illustrates analog storage units combined with boundary value monitors $45a_1$ to $45d_3$. Many circuits of this type are present in the process control circuit and are provided as uniformly constructed printed circuit boards. The number of such circuits (the specific construction of which is shown in FIG. 2) corresponds to the number of baths which are to be monitored with the process control circuit, multiplied by the number of parameters of the respective bath fluids, each of which are to be monitored and regulated for the individual baths. The circuit illustrated in FIG. 4 is, for example, assigned to the component circuit block II. The measured value supplied as an analog voltage amplitude by measured value amplifier 71 connects to switches 80 and 81 via line 79. Switches 80 and 81 may be selectively activated by a bath selection program switch. Switches 81 or 80, for example, are closed by such a bath selection-program switching mechanism. As a result, capacitor 83 is charged up to the measuring voltage. After the measuring operation has been completed, switch 81 opens again, so that capacitor 83 remains charged. This capacitor is situated at the input 84 of a measured value amplifier 85, at the output 86 of which a contact 87 of a manually operable selector switch 88 is located. If selector switch 88 is on contact 87, measuring device 90 shows the measured value which corresponds to the voltage value of capacitor 83 which may correspond, for example, to the pH value of the bath fluid of a bath assigned to that position of the selector switch. If selector switch is on another contact 89, for example, measuring device 90 shows the pH value of the bath fluid of another bath, etc. Lines 91 and 92 are connected to identical circuits mounted on printed circuit boards, as specified in FIG. 4 and which are assigned to other baths.

The boundary value monitors as indicated by 45 in FIG. 4 are likewise located at measurement outputs 86 of measured value amplifiers 85. By means of potentiometer 93, an upper voltage value may be adjusted on a differential amplifier 95. A lower value may be adjusted on a master amplifier 96. These voltage values analogously correspond to a specific pH value which cannot be permitted to drop below or exceed the upper and lower voltage values. If the voltage which is connected to the respective differential amplifier 95, or master amplifier 96 exceeds of falls below the allowable voltage which has been adjusted on the respective potentiometer, a voltage signal is created at output 97 or 98 of differential amplifier 95 or 96 such that a switching transistor 99 turns on the alarm relay 100. The alarm relay triggers an acoustical or optical alarm. In addition, switches are opened which are located in the control supply lines to the dosing valves such that no dosing supply or correction fluid, such as gold salt solution, will flow to the respective baths. Through this measurement, losses of expensive operating materials may be effectively avoided.

FIG. 5 illustrates in a block circuit diagram the measured value interrogation and boundary value monitors $45a_1$ through $45d_3$, all of which are constructed according to the circuit illustrated at 45 in FIG. 4. In the example of FIG. 4, the process control circuit comprises for the gold bath a circuit block I for the gold concentration analysis, a circuit block II for the pH value analysis, and a circuit block III for cobalt analysis. Four similar baths labeled a, b, c and d (not illustrated) are monitored and regulated by the process control circuit. Thus, three measured value interrogator and limiting value indicator-units (as shown in FIG. 4) are respectively assigned to each bath. Thus, for example, the measured value interrogator and boundary value monitor $45a_1$ is assigned to bath A and to parameter control circuit block I, whereas the measured value interrogator and limiting value indicator $45d_3$ is assigned to bath D and to circuit block III for a cobalt analysis of the bath fluid. Measured value lines $86a_1$ to $86d_3$ connected to units $45a_1$ to $45d_3$ are respectively connected to measuring devices 901 or 902 or 903 via manually operated ganged switches (in general) $88a_1$ to $88d_3$. If the measured values for the bath fluid of bath B, for example, are to be interrogated with respect to one of the individual parameters such as the value of the gold concentration, cobalt concentration, or the pH of the bath fluid, hand operable key b' is activated, so that the measuring instruments 901 through 903 will indicate the respective magnitudes of the bath parameters of bath b which is being subjected to interrogation. The switches are closed only for obtaining measurements. Normally, however, they are open in order that the measured value storage-capacitors 83 illustrated in FIG. 4 cannot discharge. Each circuit block has an alarm relay 1001 to 1003. A relay is triggered if the allowable upper or lower limiting value of the respective bath parameters is exceeded within the limiting value unit 45 belonging to a circuit block. If the limiting value is exceeded, the alarm relay assigned to each bath and to the individual bath parameter also blocks the influx of correction fluid to the respective bath such that the membrane pumps for the purpose of dosing the correction fluid for the respective parameter is switched off, and the dosing valves for the supply of correction fluid to the bath are blocked.

Although various minor modifications may be suggested by those versed in the art, it should be understood that we wish to embody within the scope of the patent warranted hereon, all such embodiments as reasonably and properly come within the scope of my contribution to the art.

We claim as our invention:

1. A process control circuit adapted for the simultaneous and repeated control and monitoring of a plurality of parameters in at least one metal-depositing bath, comprising:

a. an independent parameter control circuit block for each of said plurality of parameters, each block having i. measuring means for producing a measured value for one of said parameters;
ii. calibrator means connected to the measuring means for calibrating said measuring means;
iii. comparator means connected to said measuring means for comparing said measured value to a nominal value stored in said comparator means and creating a comparison signal;
iv. a dosing means connected to said comparator means for dosing said metal-depositing bath in response to said comparison signal;

b. a program generator means connected to each of the parameter control circuit blocks for controlling the operation of each in a simultaneous fashion so as to simultaneously control and monitor the bath parameters, said program generator means including at least
i. first switch means in each parameter circuit block for activating the calibrator means, and
ii. second switch means in each parameter circuit block for activating the measuring, comparator and dosing means to maintain tight control over the value of each parameter in the bath.

2. The circuit of claim 1 in which a temperature compensation means is connected to said measuring means for adjusting the measured value in response to temperature.

3. The circuit of claim 1 in which said calibrator means has a motor for driving a calibration control in said measuring means.

4. The circuit of claim 1 in which a program control means is connected to said measuring stage calibrator means and dosing means for controlling automatic callibration prior to filling said metal-depositing bath and for controlling measurement and dosing of said metal-depositing bath.

5. The circuit of claim 1 in which the measuring means in each of said parameter control circuit blocks has a measured value storage means connected thereto; and a boundary level monitor means being connected to each of said storage means for shutting off said dosing circuit when a boundary level is violated by the measured value.

6. The circuit of claim 5 in which a plurality of metal-depositing baths are provided, and an interrogation means having indicators is connected to each storage means associated with each of said baths and circuit blocks.

7. The process control circuit of claim 1 in which at least one parameter control circuit block is connected to monitor and regulate bath fluid metal concentration, and at least one other parameter control circuit block is connected to monitor and regulate bath fluid pH value.

8. The process control circuit of claim 7 in which the parameter control circuit block connected to monitor and regulate metal concentration of the bath fluid has in its measuring stage a measuring photoconductive resistor and a comparison photoconductive resistor to form a two beam colorimeter, an amplifier, an automatically operating potentiometer having a center tap connected at the input of said amplifier, the measuring photoconductive resistor being arranged in a feedback line of the amplifier and also being connected to the potentiometer, the other end of the potentiometer being connected to the comparison photoconductive resistance.

9. The process control circuit of claim 1, characterized in that the calibrating device has a program switch connected to a servomotor, said servomotor driving an automatic calibrating control in said measuring circuit.

10. The circuit of claim 1 in which the program control generator automatically repeats calibration and dosing in each of the parameter control circuits.

11. The circuit of claim 1 in which measured value storage means are connected to each of the parameter control circuits, interrogation means also being provided for simultaneously interrogating measured values in each of the storage means.

* * * * *